(12) United States Patent
Gambuzza

(10) Patent No.: US 7,139,528 B2
(45) Date of Patent: Nov. 21, 2006

(54) RF COUPLED DATA ACCESS ARRANGEMENT CIRCUIT FOR TELEPHONY CUSTOMER PREMISE EQUIPMENT

(75) Inventor: Michael J. Gambuzza, Pepperell, MA (US)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 10/452,711

(22) Filed: Jun. 2, 2003

(65) Prior Publication Data

US 2004/0242167 A1    Dec. 2, 2004

(51) Int. Cl.
    *H04B 7/00*     (2006.01)
(52) U.S. Cl. .................. 455/41.2; 455/556.1; 455/557; 379/405; 379/412; 379/413; 375/257
(58) Field of Classification Search ............. 455/556.1, 455/557, 525.1, 426.1, 41.2; 379/405, 412, 379/413, 377, 399; 375/257
See application file for complete search history.

(56) References Cited

U.S. PATENT DOCUMENTS

| | | | | |
|---|---|---|---|---|
| 5,500,895 | A | * | 3/1996 | Yurgelites .................... 379/412 |
| 5,621,913 | A | * | 4/1997 | Tuttle et al. ................ 455/41.2 |
| 5,654,984 | A | * | 8/1997 | Hershbarger et al. ........ 375/257 |
| 6,128,510 | A | * | 10/2000 | Beukema et al. ........... 455/557 |

* cited by examiner

*Primary Examiner*—Matthew D. Anderson
*Assistant Examiner*—Sanh Phu
(74) *Attorney, Agent, or Firm*—Buckley, Maschoff & Talwalkar LLC

(57) ABSTRACT

A data access arrangement (DAA) circuit for an item of customer premise equipment (CPE, i.e., telephone terminal equipment) utilizes RF coupling across an isolation barrier between two sides of the DAA circuit.

13 Claims, 5 Drawing Sheets

RF COUPLED DATA ACCESS ARRANGEMENT CIRCUIT FOR TELEPHONY CUSTOMER PREMISE EQUIPMENT

BACKGROUND

Telephone system regulatory requirements in the United States and elsewhere call for customer premise equipment (e.g., telephones, modems, facsimile machines, etc.) to provide galvanic isolation between the circuitry of the customer premise equipment (CPE) and the public switched telephone network (PSTN) if the CPE is to qualify for connection to the PSTN. Consequently, CPE customarily includes a circuit, known as a data access arrangement (DAA) circuit, which provides the required galvanic isolation.

Conventional DAA circuits are of one of three types: transformer coupled, capacitive coupled, and optically coupled. Each of these types of DAA circuits has disadvantages.

Transformer coupled DAA circuits typically employ a discrete external transformer (i.e., a transformer provided as a discrete component that is separate from the integrated circuitry that is part of the DAA circuit and/or the CPE equipment as a whole). The external transformer provides signal coupling to the telephone line while also providing up to 1500 Vrms or greater of isolation from the CPE side (e.g., the modem side of the CPE; the CPE side of the equipment will also sometimes be referred to as the "home side" of the equipment, regardless of whether the CPE is installed in a residence or business). The transformer may provide good common mode rejection. However, the useful bandwidth of the transformer may be limited. For example, a transformer that is suitable for a voice-band modem may not be appropriate for a broadband DSL (digital subscriber line) modem (e.g., a modem for asymmetric DSL, symmetric DSL or very high capacity DSL). Conversely, a transformer that is suitable for a DSL modem may not be suitable for a voice-band modem. As a result, it may be difficult to provide a transformer coupled DAA for a modem to be used for both voice and data. Moreover, the external transformer may be large and expensive.

Capacitive coupled DAA circuits customarily use external high voltage capacitors for coupling to the telephone line with galvanic isolation. Up to three capacitors may be employed: one for the receive path, one for the transmit path, and one for the AC coupling return path. The capacitors may add significant cost to the DAA circuit, while also occupying a substantial amount of space on the circuit board.

Optically coupled DAA circuits may employ either external or integrated optical couplers. Integrated optical coupling may be accomplished by using multi-chip module packaging techniques to include the optical components in the IC package. Alternatively, externally located off-the-shelf opto-coupling ICs may be used. In either case, optical coupling may be significantly expensive. Furthermore, the optical couplers may be limited in performance and features.

In short, conventional DAA circuits add significant cost to CPE, while also often limiting the capabilities of the CPE.

DETAILED DESCRIPTION

In some embodiments, a data access arrangement (DAA) circuit of an item of CPE may utilize RF coupling in lieu of conventional isolation coupling such as transformer, capacitive or optical coupling.

Figure 1:
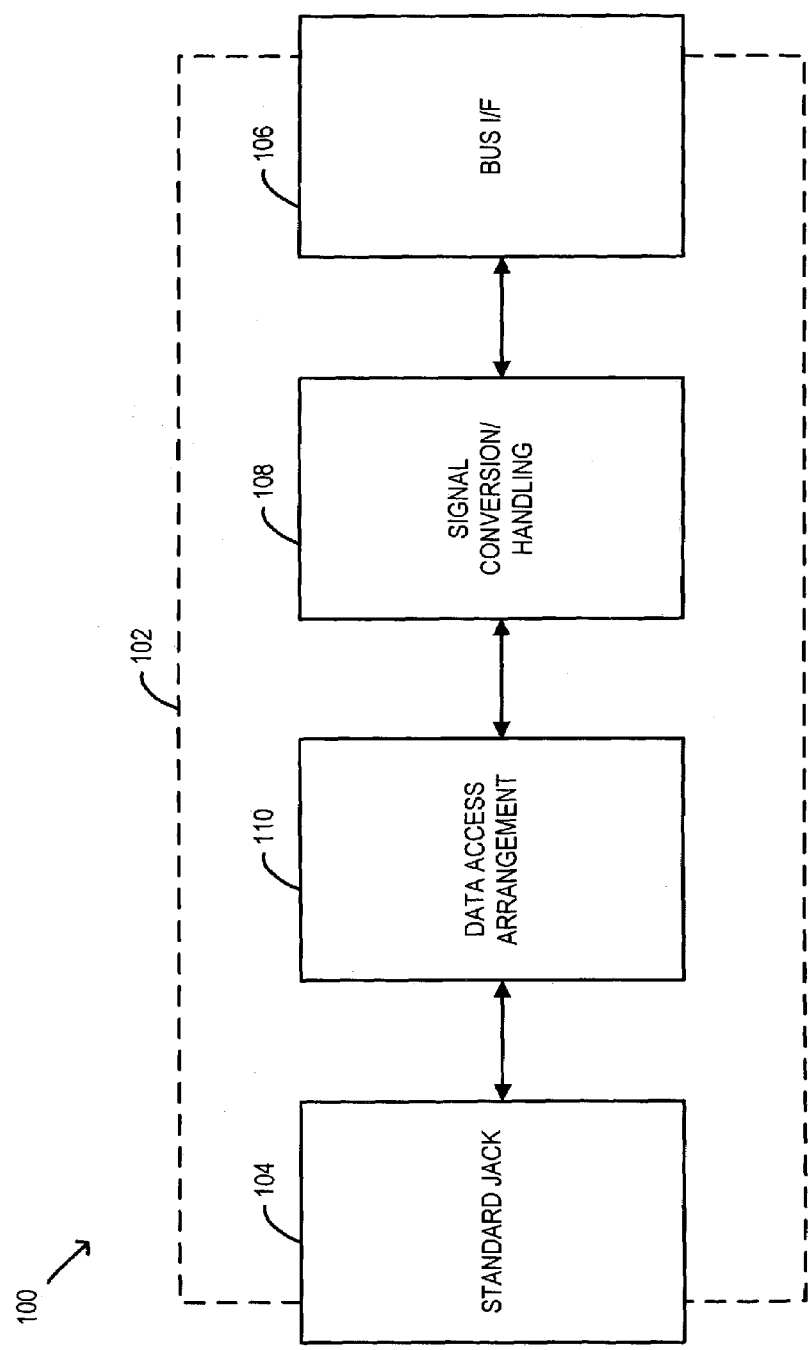
FIG. 1 is a block diagram of an item of telephony CPE provided according to some embodiments.

FIG. 1 is a simplified block diagram of an item 100 of telephony customer premise equipment (CPE) provided according to some embodiments. In the particular arrangement shown in FIG. 1, the CPE item 100 may be a data modem, but with suitable modifications of the home side circuitry of the CPE item, the CPE item may alternatively be another type of customer premise equipment, such as a telephone, a facsimile machine, a telephone answering machine or a voice mail system.

The CPE item 100 includes a housing (represented by dashed line 102). Other components of the CPE item may be mounted in and/or on the housing 102. In some embodiments, the housing 102 may be the housing of a laptop or personal computer with which the CPE item (e.g., data modem) may be physically integrated. (Other components of the computer besides the data modem/CPE item 100 are not shown in the drawing.)

The CPE item 100 also includes a jack 104 mounted at the exterior of the housing 102. The jack 104 may be, for example, a standard jack of the type which allows the CPE item 100 to be coupled via wire or cable (not shown) to the public switched telephone network (not shown).

The CPE item 100 further includes a bus interface 106 which may be provided in accordance with conventional practices to allow the CPE item 100 to be coupled to a computer bus (not shown). Also included in the CPE item 100, and coupled to the bus interface 106, is signal handling and/or conversion circuitry 108, which may be provided in accordance with conventional practices to perform the intended functions of the CPE item 100.

The CPE item 100 additionally includes a data access arrangement (DAA) circuit 110 which is connected between the jack 104 and the signal handling and/or conversion circuitry 108 and is mounted within the housing 102. The DAA circuit 110 may be provided in accordance with some embodiments of the invention. Except for the DAA circuit 110, the CPE item 100 may be entirely conventional.

Figure 2:
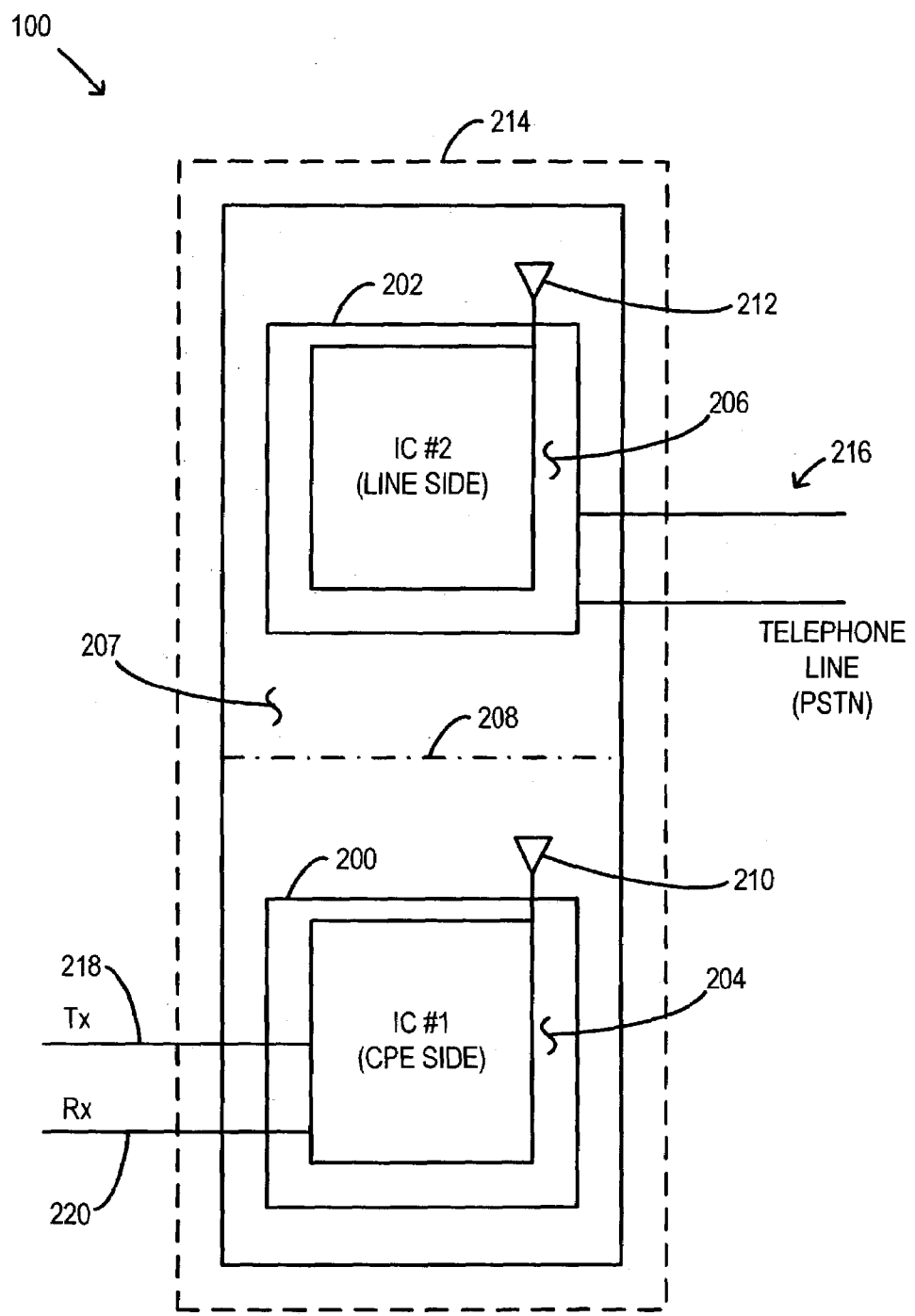
FIG. 2 is a schematic illustration of a data access arrangement (DAA) circuit that is part of the item of CPE of FIG. 1.

FIG. 2 is a schematic illustration of the DAA circuit 110 according to some embodiments. The DAA circuit 110 may include a first integrated circuit (home or CPE side IC) 200 and a second integrated circuit (line side IC) 202. The home side IC 200 may be formed on a first substrate (e.g. a silicon substrate) 204 and the line side IC 202 may be formed on a second substrate (e.g. a silicon substrate) 206. The first substrate 204 and the second substrate 206 may be separate from each other. In common parlance, the home side IC 200 may comprise a first chip (not separately indicated in the drawing) and the line side IC 202 may comprise a second chip (not separately indicated in the drawing).

The home side IC 200 and the line side IC 202 may both be mounted on a circuit board or substrate 207 in such a fashion that the home side IC 200 and the line side IC 202 are substantially co-planar. Alternatively, the home side IC 200 and the line side IC 202 may be mounted in a stacked relationship relative to each other or in another manner. In any case, the home side IC 200 and the line side IC 202 may be mounted in rather close proximity to each other. However, the home side IC 200 and the line side IC 202 may be galvanically isolated from each other, as schematically indicated by dot-dash line 208. The isolation line 208 need not represent a physical component that separates and isolates the ICs 200, 202 from each other. Rather, there may merely be a suitable gap (horizontally and/or vertically) between the ICs 200, 202 to provide for galvanic isolation therebetween such as to comply with regulatory requirements. In some embodiments, the isolation between the ICs 200, 202 may be provided by an air gap of about 2.5 mm. In other embodiments, the ICs 200, 202 may be encapsulated in a suitable packaging material (not shown), in which case the ICs 200, 202 may be separated by a smaller distance than 2.5 mm.

The home side IC 200 may include an antenna 210, which may be formed as a loop at a periphery of the IC 200. The line side IC 202 may include an antenna 212, which may be formed as a loop at a periphery of the IC 202.

The DAA circuit 110 may also include a housing 214 (shown in phantom) which may contain therein the circuit board or substrate 207 on which the ICs 200, 202 are mounted. The housing 214 may be separate from and contained within the housing 102 indicated in FIG. 1. For example, the housing 214 may be formed of conventional material used for packaging ICs.

The line side IC 202 may be coupled to a telephone line 216 via the jack 104 (FIG. 1). The home side IC 200 may be coupled to the signal conversion and/or handling circuit 108 via a transmit line 218 and a receive line 220.

Figure 3:
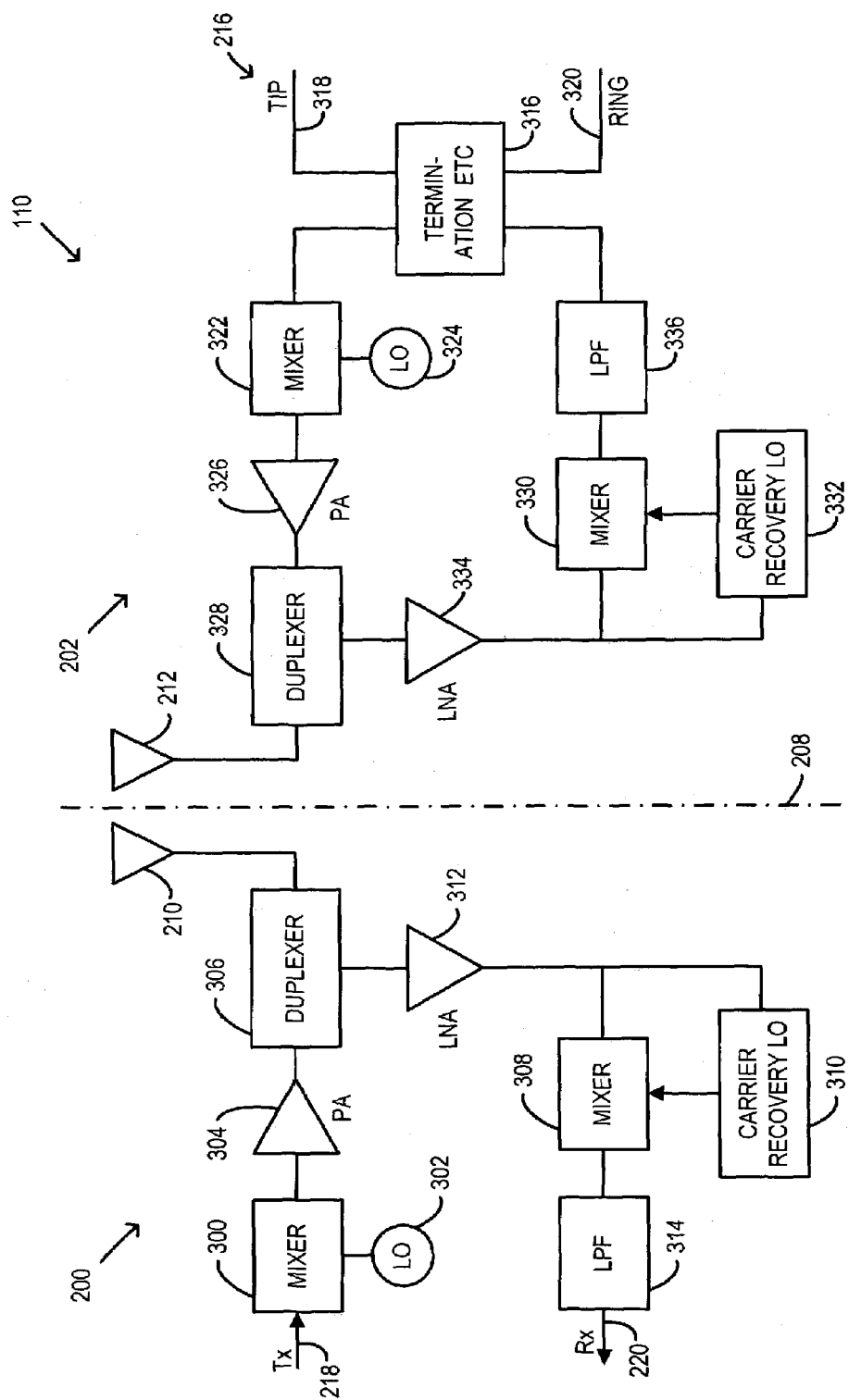
FIG. 3 is a block diagram illustration of the DAA circuit of FIG. 2.

FIG. 3 is a block diagram representation of the DAA circuit 110.

Referring to FIG. 3, circuit elements of the home side IC 200 and of the line side IC 202 are shown. Also, the ICs 200, 202 are shown as being isolated from each other by an isolation barrier 208, which, as noted above, need not be a physical component but rather may be a suitable gap between the ICs 200, 202 to provide an appropriate degree of galvanic isolation between the ICs 200, 202.

The home side IC 200 includes a transmit mixer 300 which is coupled to the transmit line 218, and a local oscillator (LO) 302 which is associated with the transmit mixer 300. The local oscillator 302 provides a carrier signal at a suitable frequency such that, through modulation by an outbound information signal received on transmit line 218, an outbound RF (radio frequency) signal is generated by the transmit mixer 300. Depending on the nature of the CPE item 100 of which the DAA circuit 110 is a part, the outbound information signal may be a data signal (in analog format), a voice signal, a combined voice and data signal, or a facsimile image signal.

The outbound RF signal generated by the transmit mixer 300 is coupled to the antenna 210 of the home side IC 200 via a power amplifier (PA) 304 and a duplexer 306, for wireless transmission of the outbound RF signal via the antenna 210 of the home side IC 200 across the isolation barrier 208 to the antenna 212 of the line side IC 202. Because the ICs 200, 202 may be in close proximity to each other, the power level of the outbound RF signal transmitted via the antenna 210 of the home side IC 200 need not be high, and may be very low.

The duplexer 306 may or may not be provided on-chip, and may include, for example, an SAW (surface acoustic wave) filter or a BAW (bulk acoustic wave) filter. In some embodiments, some or all of the duplexer 306 may be implemented via MEMS (micro-electromechanical systems) technology on the home side IC 200.

The home side IC 200 also includes a demodulation mixer 308 and a carrier recovery local oscillator 310 associated with the demodulation mixer 308. The demodulation mixer 308 and the carrier recovery local oscillator 310 are coupled via the duplexer 306 and a low noise amplifier (LNA) 312 to the antenna 210 of the home side IC 200 to receive an inbound RF signal. (Generation of the inbound RF signal will be discussed below in connection with the line side IC 202.) An output of the demodulation mixer 308 is coupled to the receive line 220 via a low pass filter (LPF) 314. The carrier recovery local oscillator 310 oscillates at a frequency that matches the frequency of the carrier signal of the inbound RF signal received via the antenna 210, the duplexer 306 and the low noise amplifier 312. The demodulation mixer 308, the carrier recovery local oscillator 310 and the low pass filter 314 together function as a demodulator to recover an inbound information signal from the inbound RF signal received via the antenna 210. The inbound information signal may be a data signal (in analog format), a voice signal, a combined voice and data signal, or a facsimile image signal.

Although not indicated in the drawing, power for the home side IC 200 may be provided by a power supply (not separately shown) of the CPE item 100.

The line side IC 202 may include circuitry 316 by which the line side IC 202 is coupled to the tip 318 and ring 320 of the telephone line 216. The circuitry 316 may perform functions such as termination of the telephone line 216 and various interface functions, which will be described briefly below. The termination, etc. circuitry 316 may be of the type generally provided in conventional DAA circuits that employ optical or capacitive isolation.

The line side IC 202 includes a transmit mixer 322 which is coupled to the telephone line 216 via the termination, etc. circuitry 316. Also included in the line side IC 202 is a local oscillator 324 which is associated with the transmit mixer 322. The local oscillator 324 provides a carrier signal at a suitable frequency such that, through modulation by an inbound information signal received via the telephone line 216, an inbound RF signal is generated by the transmit mixer 322. As noted before, the inbound information signal may be a data signal, a voice signal, a combined voice and data signal, or a facsimile image signal.

The inbound RF signal generated by the transmit mixer 322 of the line side IC 202 is coupled to the antenna 212 of the line side IC 202 via a power amplifier 326 and a duplexer 328, for wireless transmission of the inbound RF signal via the antenna 212 of the line side IC 202 across the isolation barrier 208 to the antenna 210 of the home side IC 200. Noting again that the ICs 200, 202 may be in close proximity to each other, the power level of the inbound RF signal transmitted via the antenna 212 of the line side IC 202 need not be high and may be very low.

The duplexer 328 may or may not be provided on-chip (i.e., directly as part of the IC 202). The duplexer 328 may include, for example, an SAW filter or a BAW filter. In some embodiments, some or all of the duplexer 328 may be implemented via MEMS technology on the line side IC 202.

The line side IC 202 also includes a demodulation mixer 330 and a carrier recovery local oscillator 332 associated with the demodulation mixer 330. The demodulation mixer 330 and the carrier recovery local oscillator 332 are coupled via the duplexer 328 and a low noise amplifier 334 to the antenna 212 of the line side IC 202 to receive the outbound RF signal transmitted by the antenna 210 of the home side IC 200. An output of the demodulation mixer 330 is coupled to the telephone line 216 via a low pass filter 336 and the termination, etc. circuitry 316. The carrier recovery local oscillator 332 oscillates at a frequency that matches the frequency of the carrier signal of the outbound RF signal transmitted by the antenna 210 of the home side IC 200 and received via the antenna 212, the duplexer 328 and the low noise amplifier 334 of the line side IC 202. That is, the carrier recovery local oscillator 332 is matched in frequency to the local oscillator 302 of the home side IC 200. The demodulation mixer 330, the carrier recovery local oscillator 332 and the low pass filter 336 of the line side IC 202 function as a demodulator to recover the outbound information signal from the outbound RF signal generated and transmitted by the home side IC 200 and received by the line side IC 202.

It will be appreciated that the carrier recovery local oscillator 310 of the home side IC 200 may be matched in frequency to the local oscillator 324 associated with the transmit mixer 322 of the line side IC 202. Moreover, the duplexer 306 of the home side IC 200 may be arranged so as to be suitable for receiving the inbound RF signal generated and transmitted by the line side IC 202, and the duplexer 328 of the line side IC 202 may be arranged so as to be suitable for receiving the outbound RF signal generated and transmitted by the home side IC 200. It will be appreciated that the respective local oscillators 302 and 324 of the IC 200, 202 may be at different frequencies to permit the antennas 210, 212 to be used for both transmitting and receiving the RF signals.

With the duplexers 306, 328, a full duplex channel may provided between the ICs 200, 202. However, in some embodiments the duplexers 306, 328 may be dispensed with, for example, if a simplex or half-duplex channels are to be provided.

The termination, etc. circuitry 316 may include conventional circuit blocks for performing functions such as hook switch, ring detection, surge protection, isolation of inbound and outbound signals (hybrid circuit), AC termination, receive functions, transmit functions, sinking line current (gyrator), amplification, and so forth.

The line side IC 202 may be powered from the telephone line 216.

From the foregoing it will be understood that the home side IC 200 may be considered to include a home side transmit circuit that includes the mixer 300, local oscillator 302 and power amplifier 304; and a home side receive circuit that includes the low noise amplifier 312, the mixer 308, the local oscillator 310 and the low pass filter 314. Similarly, the line side IC 202 may be considered to include a line side transmit circuit that includes the mixer 322, local oscillator 324 and power amplifier 326; and a line side receive circuit that includes the low noise amplifier 334, the mixer 330, the local oscillator 332 and the low pass filter 336.

Figure 4:
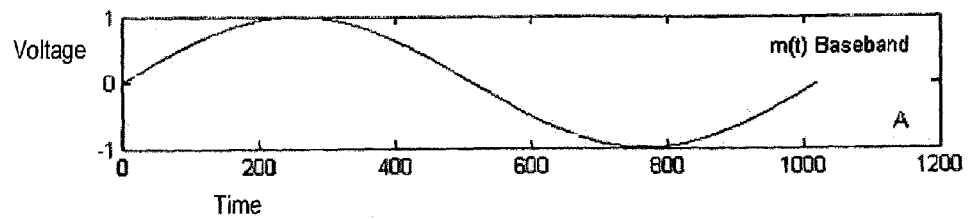
FIGS. 4–8 are simulated waveform graphs that illustrate signals that may be present at respective points of the DAA circuit of FIGS. 2 and 3.
Figure 5:
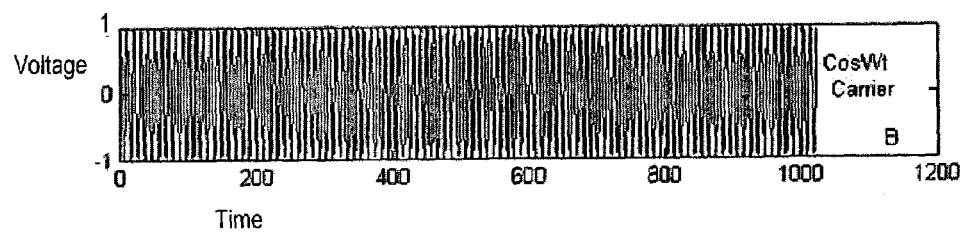
Figure 6:
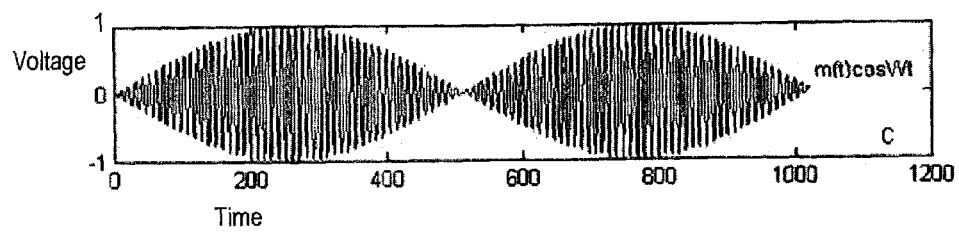

In operation, an outbound information signal (illustrated in FIG. 4 as m(t)) is received on the transmit line 218 (FIG. 3) at an input of the mixer 300 of the home side IC 200. The local oscillator 302 associated with the mixer 300 generates a carrier signal (illustrated in FIG. 5 as $\cos \omega_1 t$). The outbound information signal is mixed by the mixer 300 with the carrier signal from the local oscillator 302 to generate the outbound RF signal (modulated carrier), which is illustrated in FIG. 6 as $m(t)\cos \omega_1 t$. Thus the mixer 300 up-converts the outbound information signal to generate the outbound RF signal.

Figure 7:
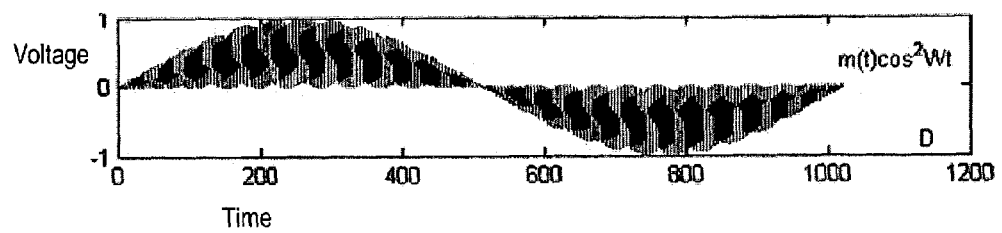
Figure 8:
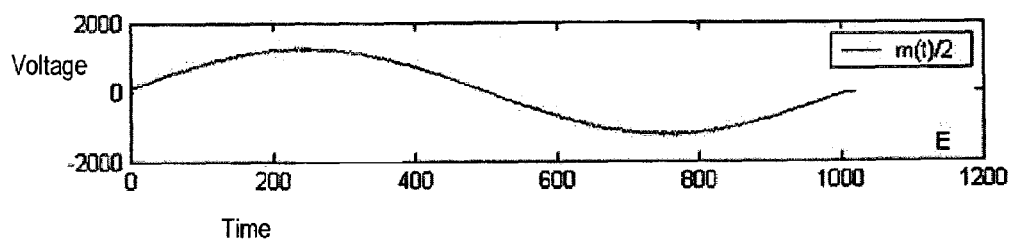

The outbound RF signal is coupled to the antenna 210 via the power amplifier 304 and the duplexer 306 and is wirelessly transmitted by the antenna 210 across the isolation barrier (or gap) 208 to the antenna 212 of the line side IC 202. The outbound RF signal induces a current in the antenna 212 and passes through the line side duplexer 328 and the low noise amplifier 334 to the line side demodulation mixer 330. Using synchronous detection or another technique, the line side demodulation mixer 330 multiplies the outbound RF signal by the signal output from the carrier recovery local oscillator 332 to produce the signal illustrated in FIG. 7 as $m(t)\cos^2 \omega_1 t$. The resulting signal is low pass filtered at the filter 336 to recover a signal (FIG. 8) that is proportional to (e.g. at half the amplitude of) the original outbound information signal. Thus the mixer 330 and the filter 336 demodulate the outbound RF signal to recover the outbound information signal.

The recovered signal may then be amplified (e.g., via a transconductance stage, which is not separately shown). The recovered outbound information signal is then coupled to the telephone line 216 for transmission as a current signal by the termination, etc. circuitry 316.

An inbound information signal (as in FIG. 4) is received via the telephone line 216 and is coupled to the line side transmit mixer 322 via the termination, etc. circuitry 316. The local oscillator 324 associated with the line side transmit mixer 322 generates a second carrier signal (e.g. $\cos \omega_2 t$, like FIG. 5). The inbound information signal is mixed by the line side transmit mixer 322 with the second carrier signal from the local oscillator 324 to generate the inbound RF signal (as in FIG. 6). Thus the mixer 322 up-converts the inbound information signal to generate the inbound RF signal.

The inbound RF signal is coupled to the antenna 212 via the power amplifier 326 and the duplexer 328 and is wirelessly transmitted by the antenna 212 across the isolation barrier (or gap) 208 to the antenna 210 of the home side IC 200. The inbound RF signal induces a current in the antenna 210 and passes through the home side duplexer 306 and the low noise amplifier 312 to the home side demodulation mixer 308. The home side demodulation mixer 308 multiplies the inbound RF signal by the signal output from the carrier recovery local oscillator 310 to produce a signal like that shown in FIG. 7. This signal is then low pass filtered at filter 314 to recover a signal (FIG. 8) that is proportional to the original inbound information signal. Thus the mixer 308 and the filter 314 demodulate the inbound RF signal to recover the inbound information signal.

The recovered signal may then be amplified (by circuitry that is not shown) and coupled to the transmit line 220 for transmission to the signal conversion and/or handling circuitry 108 (FIG. 1).

A DAA circuit like that described above in connection with FIGS. 2 and 3 may offer a substantial reduction in cost as compared to conventional DAA circuit designs, since isolation components such as a transformer, capacitors or opto-couplers may not be required. Further, the DAA circuit of FIGS. 2 and 3 may offer inherent wideband capabilities to facilitate use in combined DSL and voiceband modems.

To additionally support a low manufacturing cost, the DAA of FIGS. 2 and 3 may be suitable for packaging within a single IC package. Moreover, with the isolation barrier fixed within the IC package, circuit board layout may be less complex, since external isolation components are not needed It is also notable that with the home and line side ICs located close to each other, RF transmission therebetween may be substantially free of fading or the effects of multipath distortion.

Instead of coupling by amplitude modulated (AM) RF transmission, frequency modulation (FM) RF transmission may alternatively be employed.

In some embodiments, the antennae 210, 212 may be dispensed with, and the RF signals may be transmitted and picked up via electrical resonance of the chip substrates (silicon substrates) themselves.

As used herein and in the appended claims, "generating" a signal may include converting the signal from one format to another.

As has been seen, in some embodiments, a first integrated circuit may include a first transmit circuit to generate a first RF signal. The first integrated circuit may also include a first receive circuit. A second integrated circuit that is electrically isolated from the first integrated circuit may include a second receive circuit to receive the first RF signal and a second transmit circuit to generate a second RF signal. The first receive circuit may be capable of receiving the second RF signal.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   providing an item of telephony customer premise equipment which includes a housing and a data access arrangement (DAA) circuit inside the housing;
   wirelessly transmitting a first RF signal from a first side of the DAA circuit inside the housing to a second side of the DAA circuit inside the housing; and
   wirelessly transmitting a second RF signal from the second side of the DAA circuit inside the housing to the first side of the DAA circuit inside the housing.

2. The method of claim 1, wherein the first and second RF signals are both wirelessly transmitted.

3. The method of claim 1, wherein the first side of the DAA circuit is a home side of the DAA circuit and the second side of the DAA circuit is a line side of the DAA circuit.

4. The method of claim 1, further comprising:
   up-converting an outbound information signal to generate the first RF signal;
   demdulating the second RF signal;
   up-converting an inbound information signal to generate the second RF signal; and
   demodulating the second RF signal.

5. The method of claim 1, wherein said housing is an integrated circuit package.

6. An item of telephony customer premise equipment, comprising:
   an information signal component to generate and handle information signals;
   a jack to allow the item of telephony customer premise equipment to be coupled to a wire or cable; and
   a data access arrangement (DAA) circuit connected between the jack and the information signal component, the DAA circuit including:
   a first integrated circuit including a first transmit circuit to generate a first RF signal, the integrated circuit also including a first receive circuit; and
   a second integrated circuit that is electrically isolated from the first integrated circuit, the second integrated circuit including a second receive circuit to receive the first RF signal and a second transmit circuit to generate a second RF signal, said second integrated circuit not being capacitively coupled to said first integrated circuit;
   wherein the first receive circuit is capable of receiving the second RF signal;
   the item of telephony customer premise equipment further including a housing that contains the first and second integrated circuits;
   wherein said housing is part of a laptop computer, a personal computer, a modem, a telephone, a facsimile machine or a telephone answering machine.

7. The item of telephony customer premise equipment of claim 6, wherein the first and second integrated circuits are disposed in substantially co-planar fashion in the housing.

8. The item of telephony customer premise equipment of claim 6, wherein:
   the first transmit circuit includes a first antenna; and
   the second transmit circuit includes a second antenna.

9. The item of telephony customer premise equipment of claim 7, wherein:
   the first receive circuit shares the first antenna with the first transmit circuit; and
   the second receive circuit shares the second antenna with the second transmit circuit.

10. The item of telephony customer premise equipment of claim 6, wherein:
    the first transmit circuit includes a first mixer capable of generating the first RF signal from an outbound information signal;
    the second transmit circuit includes a second mixer capable of generating the second RF signal from an inbound information signal;
    the first receive circuit includes a first demodulator capable of recovering the inbound information signal from the second RF signal; and
    the second receive circuit includes a second demodulator capable of recovering the outbound information signal from the first RF signal.

11. The item of telephony customer premise equipment of claim 6, wherein the item of telephony customer premise equipment is a data modem.

12. The item of telephony customer premise equipment of claim 6, wherein the item of telephony customer premise equipment is a telephone.

13. The item of telephony customer premise equipment of claim 6, wherein the item of telephony customer premise equipment is a facsimile machine.

* * * * *

UNITED STATES PATENT AND TRADEMARK OFFICE
CERTIFICATE OF CORRECTION

PATENT NO. : 7,139,528 B2 Page 1 of 1
APPLICATION NO. : 10/452711
DATED : November 21, 2006
INVENTOR(S) : Michael J. Gambuzza It is certified that error appears in the above-identified patent and that said Letters Patent is hereby corrected as shown below:

Col. 7, lines 40-47, should read,

4. The method of claim 1, further comprising:

up-converting an outbound information signal to generate the first RF signal;

demodulating the first RF signal:

up-converting an inbound information signal to generate the second RF signal; and demodulating the second RF signal.

Signed and Sealed this

Sixth Day of March, 2007

JON W. DUDAS
*Director of the United States Patent and Trademark Office*